United States Patent
Kartalopoulos (10) Patent No.: US 6,577,732 B1
(45) Date of Patent: Jun. 10, 2003

(54) HIERARCHICAL ENCRYPTION TECHNIQUE FOR DENSE WAVELENGTH DIVISION MULTIPLEXED SYSTEMS USING A WAVELENGTH BUS ARCHITECTURE

(75) Inventor: Stamatios Vasilios Kartalopoulos, Annandale, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/250,345

(22) Filed: Feb. 16, 1999

Related U.S. Application Data (60) Provisional application No. 60/101,291, filed on Sep. 22, 1998.

(51) Int. Cl.[7] .............................. H04L 9/00; H04K 1/00
(52) U.S. Cl. ..................... 380/33; 380/250; 380/256; 380/268; 713/153
(58) Field of Search .......................... 380/33, 256, 268, 380/250; 713/153; 359/125, 135

(56) References Cited

U.S. PATENT DOCUMENTS

| | | | | |
|---|---|---|---|---|
| 5,007,050 A | * | 4/1991 | Kasparian et al. | 370/280 |
| 5,040,170 A | * | 8/1991 | Upp et al. | 359/135 |
| 5,063,595 A | * | 11/1991 | Ballance | 380/256 |
| 5,086,470 A | * | 2/1992 | Ballance | 380/267 |
| 5,136,587 A | * | 8/1992 | Obana et al. | 370/535 |
| 5,144,669 A | * | 9/1992 | Faulkner et al. | 380/212 |
| 5,163,092 A | * | 11/1992 | McNesby et al. | 380/28 |
| 5,473,696 A | * | 12/1995 | Van Breemen et al. | 713/162 |
| 5,742,605 A | * | 4/1998 | Norman, Jr. | 370/405 |
| 5,751,454 A | * | 5/1998 | MacDonald et al. | 359/119 |
| 5,784,184 A | * | 7/1998 | Alexander et al. | 359/125 |
| 5,796,502 A |   | 8/1998 | Haller, Jr. | |
| 6,097,736 A | * | 8/2000 | Proctor et al. | 370/480 |

* cited by examiner

*Primary Examiner*—Thomas R. Peeso
*Assistant Examiner*—Kambiz Zand
(74) *Attorney, Agent, or Firm*—Gregory J. Murgia

(57) ABSTRACT

Transmission-based data security is provided in dense wavelength division multiplexing systems using a transmission scheme that incorporates hierarchical scrambling techniques with a unique multiplexing arrangement. Information supplied by one or more sources is multiplexed according to a predetermined scrambling pattern and transmitted in a parallel format using one or more wavelength channels in a wavelength division multiplexed signal. By transmitting the multiplexed and scrambled information in parallel, the wavelength channels effectively function as a parallel bus (a "wavelength bus"). Multiple stages of scrambling can be applied to the multiplexed and scrambled information transported in the wavelength bus. For example, individual bit streams carried within each wavelength channel of the wavelength bus can be separately scrambled according to another predetermined scrambling pattern. Individual bit streams can also be routed among the wavelength channels according to another predetermined scrambling pattern so that the order of the wavelength channels is effectively scrambled. Information can also be transferred among multiple wavelength buses to provide yet another level of scrambling. The scalability of the wavelength bus provides a very flexible transport architecture that is particularly well-suited for incorporating data security measures that augment user-provided encryption and the like.

20 Claims, 5 Drawing Sheets

HIERARCHICAL ENCRYPTION TECHNIQUE FOR DENSE WAVELENGTH DIVISION MULTIPLEXED SYSTEMS USING A WAVELENGTH BUS ARCHITECTURE

CROSS-REFERENCE TO RELATED APPLICATIONS

This application claims the benefit of U.S. Provisional Application Serial No. 60/101,291 filed on Sep. 22, 1998. This application is related to co-pending U.S. applications Ser. No. 09/237,122 (Kartalopoulos 11) filed on Jan. 26, 1999 and U.S. application Ser. No. 09/244,216 (Kartalopoulos 14), filed on Feb. 4, 1999.

FIELD OF THE INVENTION

The invention relates generally to lightwave communication systems and, more particularly, to secure transmission of information in dense wavelength division multiplexing systems.

BACKGROUND OF THE INVENTION

Optical fiber has become the transmission medium of choice for communication networks because of the speed and bandwidth advantages associated with optical transmission. Wavelength division multiplexing (WDM), which combines many optical signals at different wavelengths for transmission in a single optical fiber, is being used to meet the increasing demands for more speed and bandwidth in optical transmission applications. With recent advances in optical networking technology, system manufacturers are now contemplating dense wavelength division multiplexing (DWDM) systems that carry, for example, as many as 40, 80, or more channels in a single fiber.

With the increased capacity provided by these DWDM systems, data security becomes a major concern because of the increased amount of transmitted information that is susceptible to being unlawfully accessed. In most public networks, end users implement data security measures such as encryption before supplying information for transmission. One of the more common encryption techniques is to use cryptographic codes to scramble or alter the content of the data. Unfortunately, even some of the most sophisticated codes have been compromised by so-called "hackers" using advanced technologies.

In general, DWDM systems do not incorporate data security measures. Moreover, if information is scrambled at all, it is typically done for reasons other than security. Using Synchronous Optical Network (SONET) systems as an example, information transmitted within an optical channel is scrambled to ensure that the transmitted information is less susceptible to the adverse effects of optical impairments. For example, scrambling is used to avoid the occurrence of a consecutive string of "0"s or "1"s in a data stream, the disadvantages of which are well known to those skilled in the art. However, the scrambling patterns and techniques used in SONET transport are not meant to be "secret" codes and, as such, are not considered as a data security measure for safeguarding the content of the transmitted information.

SUMMARY OF THE INVENTION

The security of information transmitted in a DWDM system is substantially improved according to the principles of the invention with a transmission scheme that incorporates multiple stages of scrambling with a unique multiplexing arrangement. More specifically, information supplied by one or more sources is multiplexed according to a predetermined scrambling pattern and transmitted in a parallel format using one or more wavelength channels in a wavelength division multiplexed signal. By transmitting the multiplexed and scrambled information in parallel, the wavelength channels effectively function as a parallel bus (a "wavelength bus").

Data security is further augmented according to the principles of the invention using a hierarchical approach in which multiple stages of scrambling can be applied to the multiplexed and scrambled information transported in the wavelength bus. For example, individual bit streams carried within each wavelength channel of the wavelength bus can be separately scrambled according to another predetermined scrambling pattern. Individual bit streams can also be routed among the wavelength channels according to another predetermined scrambling pattern so that the order of the wavelength channels is effectively scrambled. Information can also be transferred among multiple wavelength buses to provide yet another level of scrambling.

Consequently, the wavelength bus provides a very flexible transport architecture that is particularly well-suited for incorporating data security measures to augment user-provided encryption and the like. Additionally, the wavelength bus offers many transmission-related efficiencies as compared to prior DWDM transport schemes. Some examples include, but are not limited to, more efficient bandwidth utilization, reduced latency because of less serial-to-parallel and parallel-to-serial conversions, and resource sharing among a group of wavelength channels.

BRIEF DESCRIPTION OF THE DRAWING

A more complete understanding of the present invention may be obtained from consideration of the following detailed description of the invention in conjunction with the drawing in which.

DETAILED DESCRIPTION OF THE INVENTION

Before describing the specific embodiments of the present invention, a brief overview of the wavelength bus architecture will be provided to facilitate a better understanding of the principles of the invention. After describing the wavelength bus architecture, several embodiments will be described for implementing data security measures within the wavelength bus transport scheme.

In a typical DWDM system, a number of different optical channels, i.e., wavelength channels, within an optical fiber are each used to transport a serial bit stream. As such, DWDM is a channelized technology in which a wavelength channel must be dedicated to carrying only traffic supplied by a single source or user. This type of transport scheme has disadvantages, such as wavelength exhaustion once all available wavelength channels are assigned, inefficient use of the total bandwidth when not all wavelength channels are being used at the maximum possible bit rate, and limitations on the speed of transport over a given wavelength channel because of limitations in the circuitry used for processing the signals at the receiver, to name a few.

To solve the aforementioned problems, a DWDM transport scheme was proposed in a co-pending U.S. application Ser. No. 09/237,122 (Kartalopoulos 11), filed Jan. 26, 1999, which is herein incorporated by reference in its entirety. In this proposed transport scheme, information is transported in a parallel format in a DWDM system using a parallel bus architecture. A selected number of wavelength channels in a multi-wavelength DWDM signal are allocated or partitioned into a parallel bus transmission group (a "wavelength bus"). Information supplied by one or more sources is multiplexed, such as by byte interleaving, into a parallel format and transmitted at the same transmission rate in each of the wavelength channels of the wavelength bus. According to the principles of the present invention, a configurable add/drop capability is provided for selectively removing and inserting information transported in the wavelength bus.

Figure 1:
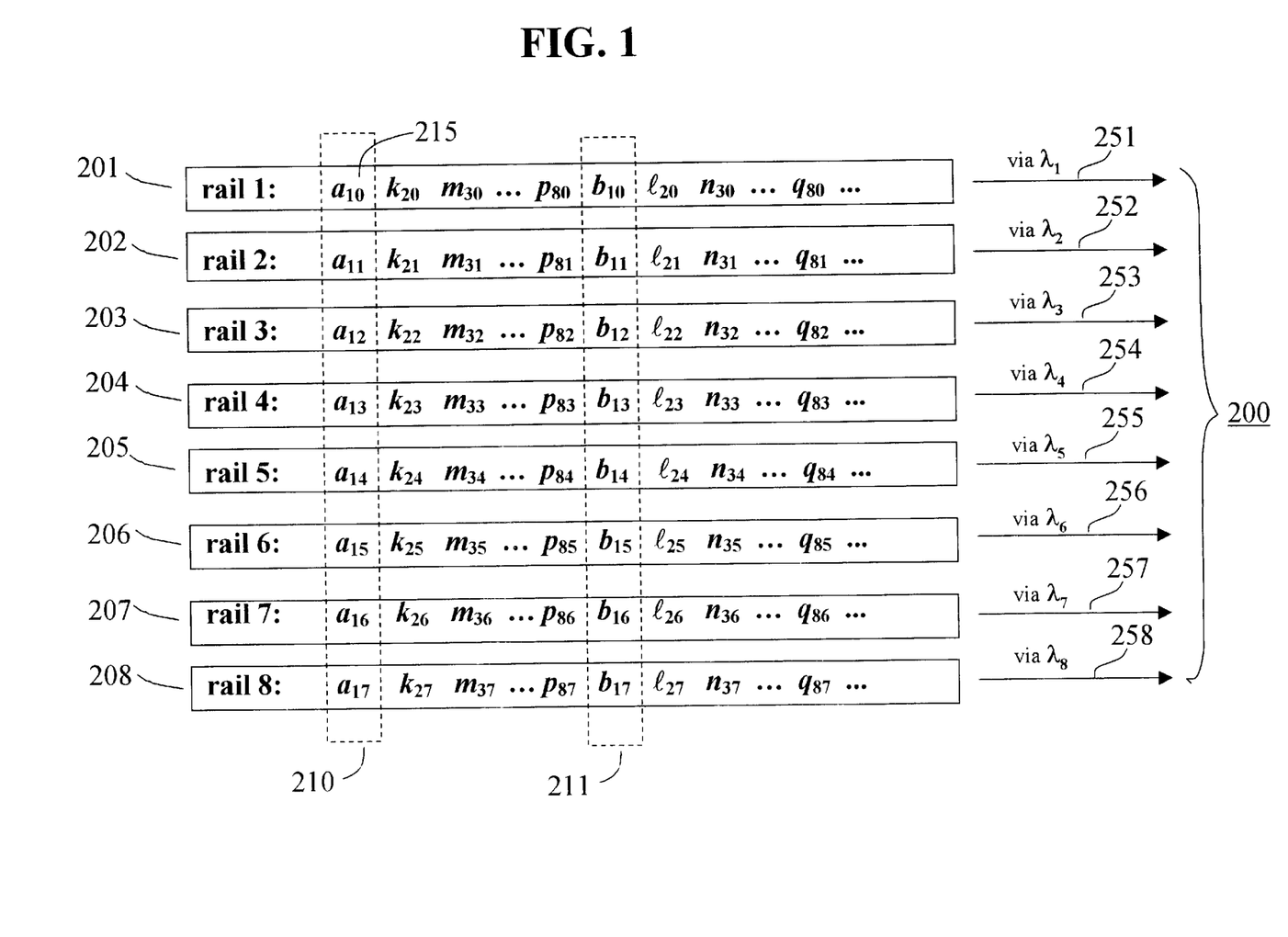
FIG. 1 is a simplified diagram showing one exemplary data structure for transporting information in a wavelength bus according to the principles of the invention.

The following brief description of the wavelength bus architecture is included to promote a better understanding of the principles of the present invention. Briefly, FIG. 1 shows an example of how data is transported according to the wavelength bus architecture. Wavelength bus 200 comprises wavelength channels 251–258 ($\lambda_1$ to $\lambda_8$) wherein each of wavelength channels 251–258 is used to transport information from one or more sources (not shown) supplied in a parallel format via rails 201–208. As shown, the information to be transported via wavelength bus 200 is organized in bytes using parallel byte interleaving. By way of example, byte 210, the structure of which is representative of the other bytes as well, comprises 8 bits, one of which is shown as bit 215. Byte 210 includes bits $\alpha_{10}$ through $\alpha_{17}$, wherein $\alpha_{10}$ represents bit 0 of byte $\alpha$ supplied by source 1, $\alpha_{17}$ represents bit 7 of byte $\alpha$ supplied by source 1, and so on. Because the data is in a parallel format, each of rails 201–208 includes one bit of each byte, such as byte 210. As a result, wavelength bus 200 is effectively an 8-bit wide bus using 8 different wavelength channels 251–258 to transport each byte supplied via rails 201–208.

In the example shown in FIG. 1, 8-bit bytes are byte interleaved so that bytes from a particular traffic source are repeated every eight parallel bytes. More specifically, byte 210 ($\alpha_{10}$–$\alpha_{17}$) from source 1 is supplied via rails 201–208 so that bit $\alpha_{10}$ is transported in wavelength channel 251 ($\lambda_1$), bit $\alpha_{11}$ is transported in wavelength channel 252 ($\lambda_2$), and so on. The next byte from source 1 is byte 211 ($b_{10}$–$b_{17}$) which is byte interleaved according to a predefined byte repetition rate and transported using the same wavelength channels 251–258 ($\lambda_1$–$\lambda_8$) in wavelength bus 200. In this example, a byte repetition rate is selected so that byte 211 from source 1 is transmitted after intervening bytes from other sources are transmitted, e.g., bytes k and l from source 2, bytes m and n from source 3, bytes p and q from source 8, and so on.

Although each wavelength channel 251–258 still contains a serially transmitted bit stream, parallel byte interleaving results in a parallel transmission scheme whereby a byte of information from any given source is transmitted using all wavelength channels 251–258 of wavelength bus 200. Accordingly, parallel transmission in the wavelength bus requires that each wavelength channel 251–258 in wavelength bus 200 transmit at the same transmission bit rate regardless of the bit rate of the signal sources.

The wavelength bus described in the foregoing embodiment is meant to be illustrative only and not limiting in any way. For example, a byte size of 8 bits was used as an example, but the byte size may be any number of bits. Wavelength bus 200 is also shown to include 8 wavelength channels 251–258, however, wavelength bus 200 may comprise any number of wavelength channels. As will be described in more detail, a single optical fiber carrying a DWDM signal may also have more than one wavelength bus therein. For example, a wavelength division multiplexed signal can be partitioned into multiple wavelength buses with each wavelength bus sized according to the bandwidth requirements of the traffic to be transported. The wavelength bus is sized by changing the number of optical channels, i.e., wavelength channels, by changing the transmission bit rate for the wavelength channels in the wavelength bus, or by a combination of both. A single wavelength bus can transport a combination of differently formatted traffic (e.g., SONET, ATM, IP, etc.) as well as traffic supplied at different bit rates. Alternatively, because different types of traffic have different requirements, a group of wavelength buses may be partitioned so that each wavelength bus is sized to transport one type of traffic within that wavelength bus. This scalability allows the DWDM signal to be optimally designed according to heterogeneous traffic requirements.

Figure 2:
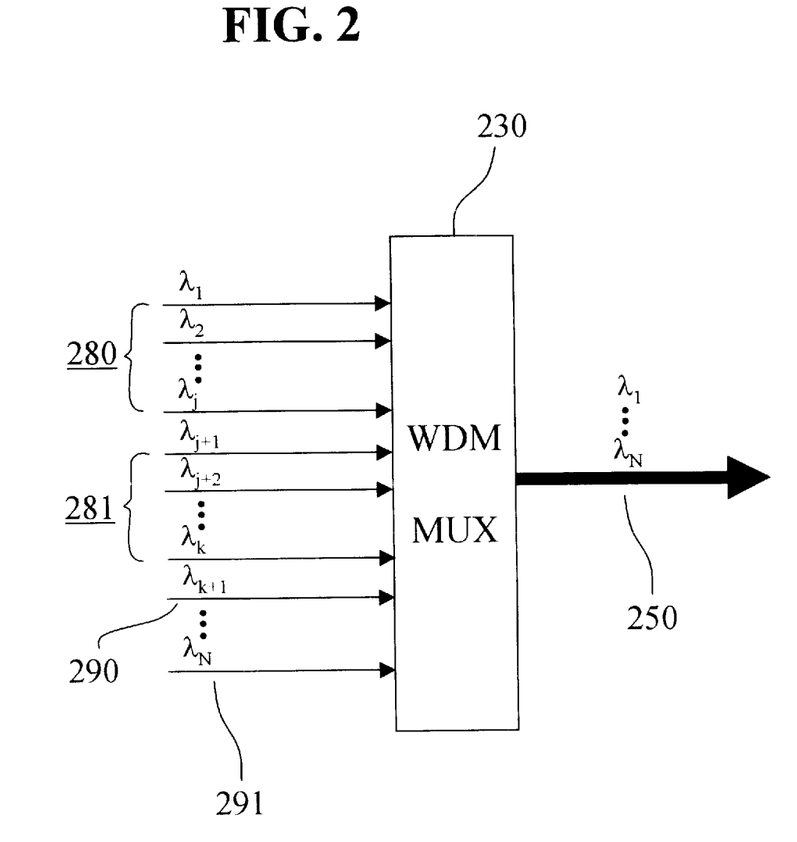
FIG. 2 is a simplified block diagram illustrating the scalability of the wavelength bus architecture according to the principles of the invention.

In particular, FIG. 2 illustrates the scalability advantages of using a wavelength bus architecture. As shown, a wavelength division multiplexer 230 multiplexes many different wavelength channels ($\lambda_1$–$\lambda_N$) for transmission in a single optical fiber 250. In this example, wavelength channels ($\lambda_1$–$\lambda_j$) are allocated to form wavelength bus 280, wavelength channels ($\lambda_{j+1}$–$\lambda_k$) are allocated to form wavelength bus 281, and wavelength channel 290 ($\lambda_{k+1}$) through wavelength channel 291 ($\lambda_N$) can be used for other wavelength buses or used for conventional DWDM transport, i.e., not grouped into wavelength buses. Accordingly, a DWDM signal transported in optical fiber 250 may have one or more wavelength buses, each of which may have any number of wavelength channels, and the wavelength buses may be used in conjunction with conventional transport schemes within the same DWDM signal. It should be noted that the size and number of wavelength buses may vary so this embodiment is only meant to be illustrative and not limiting.

Figure 3:
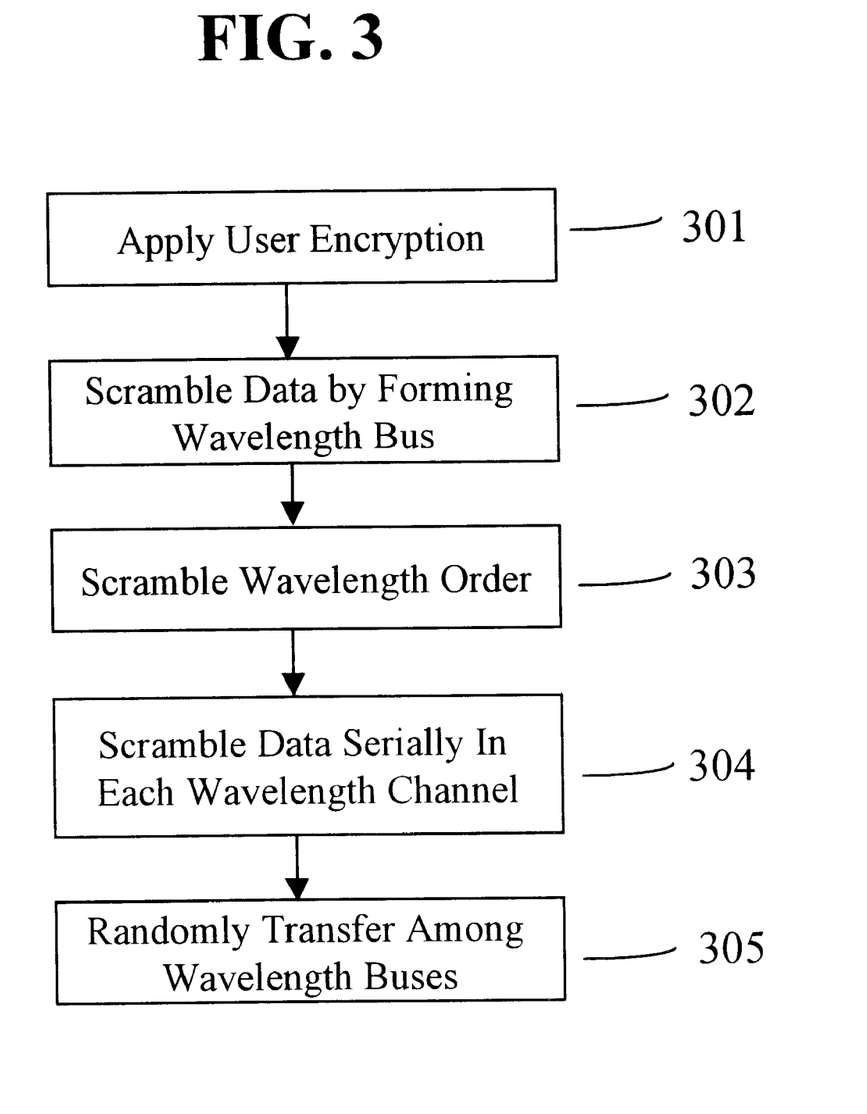
FIG. 3 is a simplified flow diagram showing the method steps according to an exemplary embodiment of the invention.
Figure 4:
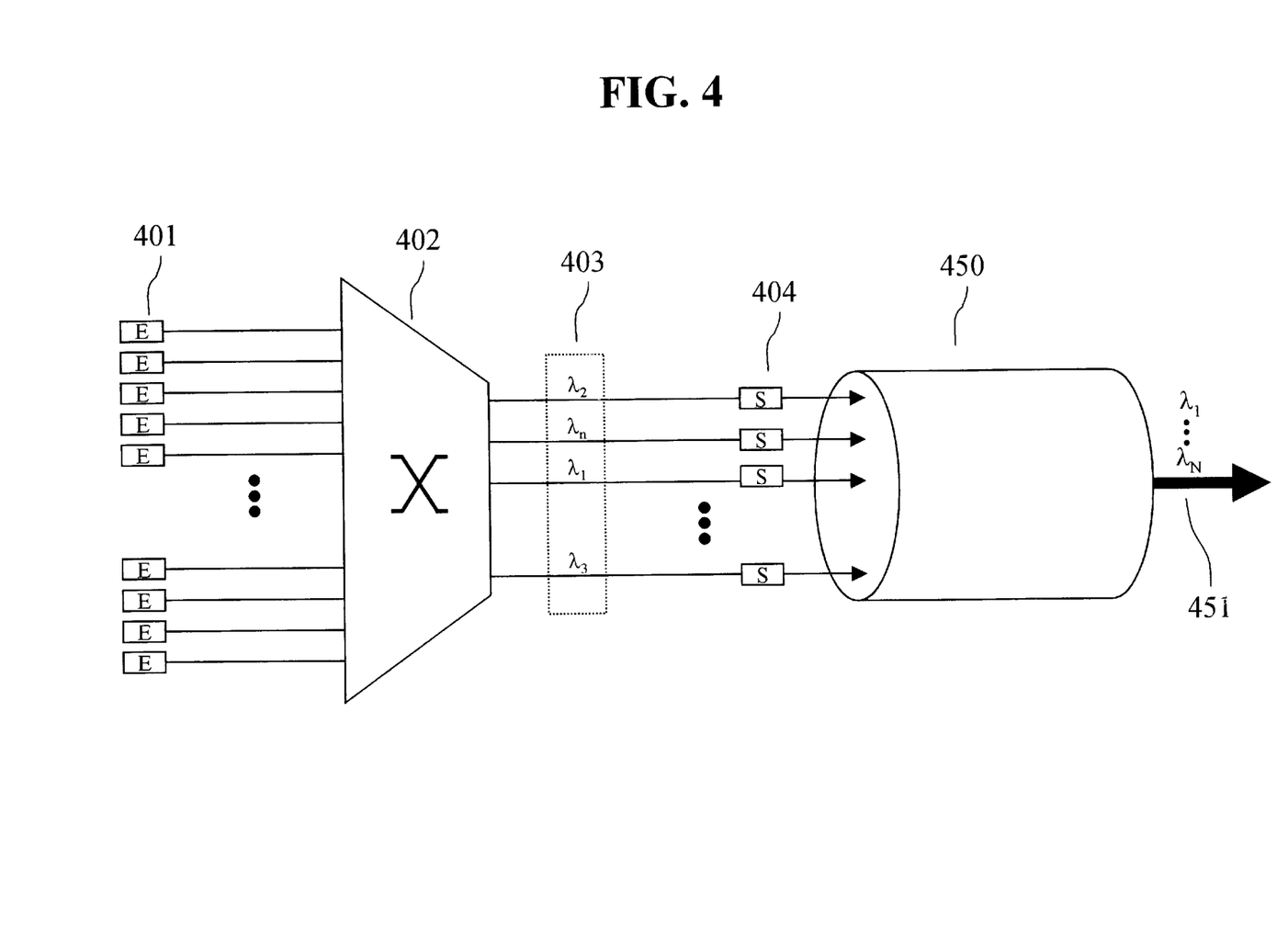
FIGS. 4 and 5 are simplified block diagrams showing other exemplary embodiments according to the principles of the invention.

According to the principles of the invention, the wavelength bus architecture can be advantageously used to incorporate hierarchical data security measures in the transmission of information in an optical transmission link. These hierarchical data security measures include multiple levels or stages of scrambling implemented as part of the transmission scheme to enhance security measures that may be implemented by the end user. FIGS. 3 and 4 illustrate the hierarchical data security measures according to the principles of the invention, wherein FIG. 3 shows an exemplary embodiment of a method and FIG. 4 shows an exemplary embodiment of a corresponding arrangement for use in a DWDM system. Referring to FIG. 3, data may be encrypted prior to being supplied for transmission in a wavelength bus (step 301). By way of example only, this encryption may be performed by the user supplying the data using well known techniques. In the SONET context for example, this type of encryption would be regarded as path level encryption since the data is encrypted and decrypted on an end-to-end basis.

In step 302, data is formatted for transport in a wavelength bus using the techniques previously shown and described in FIGS. 1 and 2. As part of the parallel byte multiplexing scheme, which was described with reference to FIG. 2, the bytes and corresponding bits supplied by one or more sources can be scrambled according to a predetermined scrambling pattern before placement into the serial rails of the wavelength bus. The predetermined scrambling pattern can be selected from well-known scrambling algorithms or encryption techniques for incorporation as part of the multiplexing scheme according to the principles of the invention. As part of the multiplexing and scrambling scheme for forming the serial rails of data to be transported in the wavelength bus, "dummy" bytes can also be multiplexed along with the data into the parallel bus to add a further level of security.

As depicted by step 303, another stage of scrambling can be implemented whereby the individual serial rails containing bytes and the corresponding bits are routed or otherwise cross-connected to the wavelength channels in a random manner according to another predetermined scrambling pattern. Alternatively, the order of the wavelength channels may be changed after the serial rails are converted into optical format. In either case, the result is that the first rail of data may not necessarily be routed over the first wavelength channel, the second rail of data may not be routed over the second wavelength channel, and so on. Using FIG. 1 as an example, rail 201 in FIG. 1 may be routed for transport on wavelength channel 253 ($\lambda_3$), rail 202 may be routed for transport on wavelength channel 258 ($\lambda_8$), and so on. This stage of scrambling effectively results in the scrambling of the wavelength order within the wavelength bus. Again, a specific implementation for a suitable scrambling algorithm to re-order the sequence of the wavelength channels will be apparent to those skilled in the art.

Step 304 represents another stage of scrambling whereby data within each rail of the wavelength bus is separately scrambled according to another predetermined scrambling pattern. More specifically, each of the wavelength channels in the wavelength bus carries one serial bit stream of the previously multiplexed and scrambled data. In step 304, each serial bit stream within its respective wavelength channel is scrambled according to a predetermined scrambling pattern. Moreover, a different scrambling algorithm may be applied to each serial bit stream or the same scrambling algorithm may be applied to 2 or more serial bit streams. Again, a specific implementation for suitable scrambling algorithms will be apparent to those skilled in the art.

Step 305 represents yet another stage of scrambling that can be implemented as part of the wavelength bus transmission scheme. As previously described, a wavelength division multiplexed signal may have more than one wavelength bus therein. Consequently, this scalability allows for another level of scrambling whereby data carried in one wavelength bus may be transferred or otherwise exchanged at some point in the transmission path to another wavelength bus having different wavelength channels. Moreover, the first wavelength bus originally carrying the data may then be adapted to receive decoy data after the transfer of the "real" data to the second wavelength bus. For someone tapping into the transmission line, the first wavelength bus will still appear to be carrying data, however, this data will in fact be decoy data.

It should be noted that various combinations of the above stages of scrambling may be implemented in conjunction with the wavelength bus. Additionally, because both ends of the transmission path, i.e., where the data is inserted and extracted from the wavelength bus, must have knowledge of the various scrambling patterns being used, the overall transmission path essentially becomes a private link from a security point of view. Synchronization of the various scrambling codes or algorithms may also be required at each end of the transmission path. By way of example only, synchronization of the scrambling codes between the ends may be achieved using synchronization data that is transported along with the scrambled data or by communicating synchronization requirements via a separate secured path.

FIG. 4 represents one exemplary arrangement for implementing the aforementioned stages of scrambling according to the principles of the invention. The detailed description for each stage of scrambling provided above will not be repeated here for sake of brevity. As shown, encryption may be applied to data supplied from multiple sources using encryption devices 401 prior to the data being formatted and converted for transmission in the wavelength bus. The data can then be further scrambled as part of the multiplexing scheme carried out within parallel byte multiplexer 402. For simplicity of illustration and understanding, the re-ordering of wavelength channels or the random routing of serial bit streams onto different wavelength channels is depicted functionally in block 403 whereby the first rail of data is shown to be transported via the second wavelength channel ($\lambda_2$), the second rail of data via the nth wavelength channel ($\lambda_n$), and so on. The data contained in each serial bit stream transported in a respective wavelength channel may be further scrambled within that respective wavelength channel by scrambling devices 404. Optical fiber 450 is shown to carry each of the wavelength channels in the wavelength bus as a composite wavelength division multiplexed signal 451 comprising $\lambda_1$ through $\lambda_n$. It should be noted that signal 451 may contain other wavelength channels, but these are not shown for simplicity of illustration.

Figure 5:
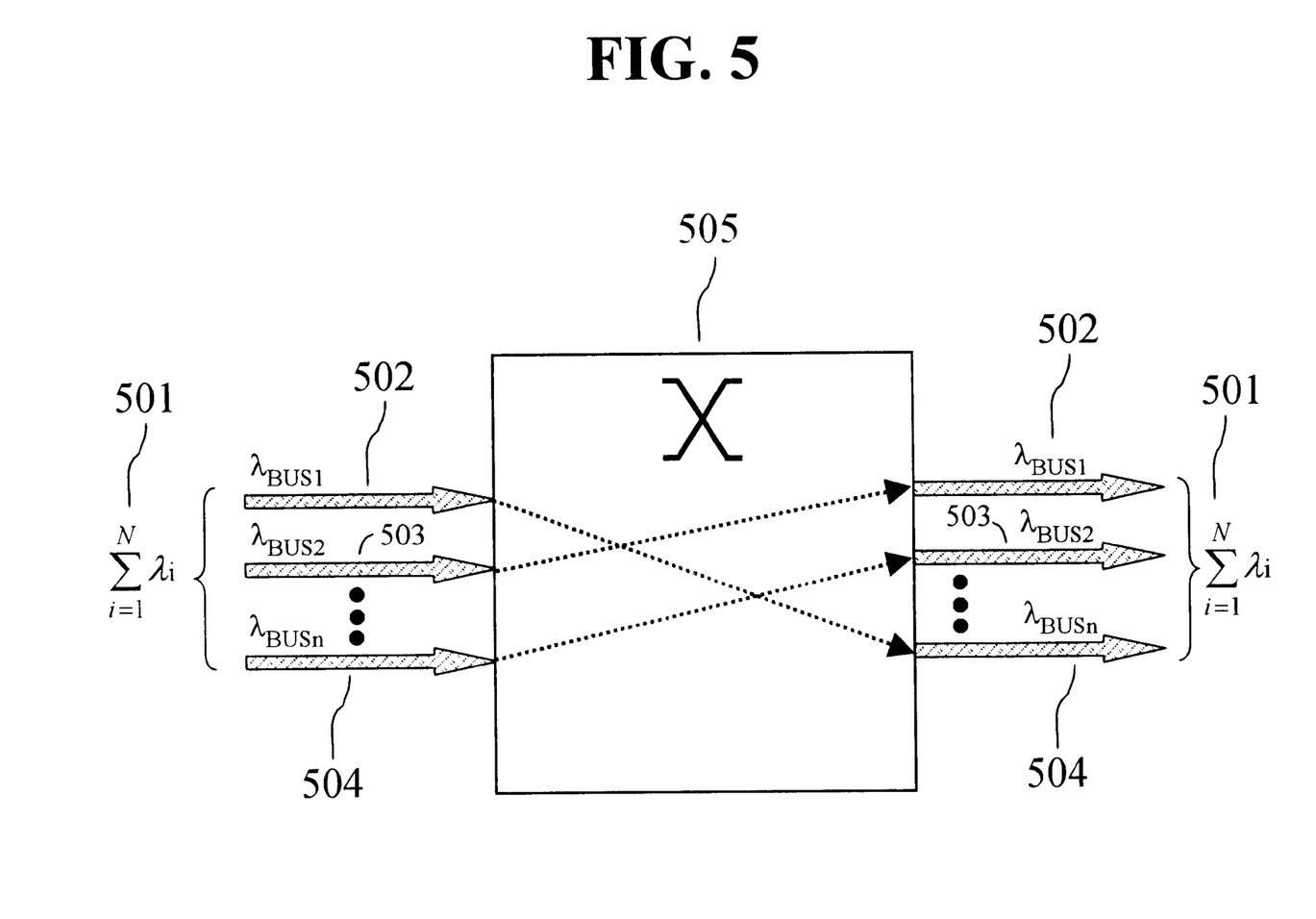

FIG. 5 illustrates the stage of scrambling wherein data carried by one wavelength bus may be routed, cross-connected or otherwise transferred to other wavelength buses at selected points in the transmission path. In particular, a composite signal 501 ($\lambda_i$) having N wavelength channels ($\lambda_1$ to $\lambda_N$) is partitioned into n wavelength buses 502–504, labeled as $\lambda_{BUS1}$ through $\lambda_{BUSn}$. As previously described, each of the wavelength buses 502–504 in composite signal 501 must have channels with different wavelengths. A routing device 505 is used at a selected point in the transmission path for transferring data between the different wavelength buses. For the example shown in FIG. 5, data transported within wavelength bus 502 ($\lambda_{BUS1}$) is transferred to wavelength bus 504 ($\lambda_{BUSn}$), data transported within wavelength bus 503 ($\lambda_{BUS2}$) is transferred to wavelength bus 502 ($\lambda_{BUS1}$), and data transported within wavelength bus 504 ($\lambda_{BUSn}$) is transferred to wavelength bus 503 ($\lambda_{BUS2}$). In this example, each wavelength bus will therefore include its same wavelength channels throughout the transmission path, but will carry different data on its wavelength channels depending on the routing function implemented in routing device 505. Those skilled in the art will recognize numerous implementations for routing device 505, including but not limited to, optical-to-electrical and electrical-to-optical conversion devices, electrical cross-connect arrangements, optical cross-connect arrangements, and so on.

The foregoing is merely illustrative of the principles of the invention. Those skilled in the art will be able to devise numerous arrangements, which, although not explicitly shown or described herein, nevertheless embody principles that are within the spirit and scope of the invention. In general, the scalability aspects of the wavelength bus architecture illustrate the flexibility of the wavelength bus architecture for implementing various transmission-based security measures. For example, other embodiments employing different combinations of the data scrambling stages described herein are contemplated by the teachings of the invention. Moreover, the principles of the invention described herein are equally applicable to long haul and short haul transmission applications, digital communications systems, computer communications systems, local area network applications, and the like. Accordingly, the scope of the invention is limited only by the claims that follow.

I claim:

1. A method for improving the security of information being transmitted in a wavelength division multiplexed signal having a plurality of optical channels of different wavelengths, the method comprising:

receiving parallel-formatted information supplied by at least one source;

multiplexing the parallel-formatted information according to a first predetermined scrambling pattern; and transporting the multiplexed and scrambled information in a parallel bus transmission group using individual optical channels of different wavelengths within the wavelength division multiplexed signal, the parallel bus transmission group including a predetermined number of the plurality of optical channels, each having a different wavelength, for carrying the multiplexed and scrambled information, wherein the multiplexed and scrambled information is formatted as bytes, each byte having N bits, the transporting step further characterized by byte-wide parallel transmission wherein each optical channel of a different wavelength in the parallel bus transmission group carries a corresponding one of the N bits of a byte being transmitted.

2. The method of claim 1, wherein each of the optical channels in the transmission group is adapted to receive one serial bit stream of the multiplexed and scrambled information, further comprising the step of scrambling the serial bit stream within each of the optical channels in the transmission group according to a second predetermined scrambling pattern, whereby a plurality of stages of scrambling are applied to the information being transmitted in the wavelength division multiplexed signal.

3. The method of claim 2, further comprising the step of routing the serial bit streams among the optical channels in the transmission group according to a third predetermined scrambling pattern.

4. A method for improving the security of information being transmitted in a wavelength division multiplexed signal having a plurality of optical channels, the method comprising:

scrambling the information to be transmitted by
allocating a predetermined number of the plurality of optical channels operating at the same transmission rate to constitute a transmission group within the wavelength division multiplexed signal,
receiving parallel-formatted information supplied by at least one source,
multiplexing the parallel-formatted information according to a first predetermined scrambling pattern, and
transmitting the multiplexed and scrambled information in a parallel format using each of the optical channels in the transmission group, wherein each of the optical channels in the transmission group is adapted to receive one serial bit stream of the multiplexed and scrambled information;
scrambling the serial bit stream within each of the optical channels in the transmission group according to a second predetermined scrambling pattern, whereby a plurality of stages of scrambling are applied to the information being transmitted in the wavelength division multiplexed signal;

routing the serial bit streams among the optical channels in the transmission group according to a third predetermined scrambling pattern;

transporting a plurality of transmission groups in the wavelength division multiplexed signal, each of the plurality of transmission groups capable of earring multiplexed parallel-formatted information therein; and transferring information being transmitted in one of the plurality of transmission groups for transmission in another one of the plurality of transmission groups according to a fourth predetermined scrambling pattern.

5. The method of claim 1, further comprising the step of encrypting the parallel-formatted information supplied by the at least one source.

6. The method of claim 1, wherein the parallel-formatted information supplied by the at least one source is encrypted.

7. The method of claim 1, wherein the multiplexed information comprises interleaved bytes of information in a parallel format so that parallel-formatted information supplied by a first source is byte interleaved with parallel-formatted information supplied by at least a second source.

8. The method of claim 1, further comprising the step of inserting dummy bytes for transmission along with the multiplexed information.

9. An arrangement for improving the security of information being transmitted in a wavelength division multiplexed signal having a plurality of optical channels of different wavelengths, the arrangement comprising:

a multiplexer capable of receiving parallel-formatted information supplied by at least one source and multiplexing the parallel-formatted information, the multiplexer including means for scrambling the parallel-formatted information according to a first predetermined scrambling pattern; and a transmitter for transmitting the multiplexed and scrambled information in a parallel bus transmission group using individual optical channels of different wavelengths within the wavelength division multiplexed signal, the parallel bus transmission group including a predetermined number of the plurality of optical channels, each having a different wavelength, for carrying the multiplexed and scrambled information, wherein the multiplexed and scrambled information is formatted as bytes, each byte having N bits, the transporting step further characterized by byte-wide parallel transmission wherein each optical channel of a different wavelength in the parallel bus transmission group carries a corresponding one of the N bits of a byte being transmitted.

10. The arrangement of claim 9, wherein each of the optical channels in the transmission group is adapted to receive one serial bit stream of the multiplexed and, scrambled information, further comprising means for scrambling the serial bit stream within each of the optical channels in the transmission group according to a second predetermined scrambling pattern, whereby a plurality of stages of scrambling are applied to the information being transmitted in the wavelength division multiplexed signal.

11. The arrangement of claim 10, further comprising means for routing the serial bit streams among the optical channels in the transmission group according to a third predetermined scrambling pattern.

12. An arrangement for improving the security of information being transmitted in a wavelength division multiplexed signal having a plurality of optical channels, the arrangement comprising:

a multiplexer capable of receiving parallel-formatted information supplied by at least one source and multiplexing the parallel-formatted information, the multiplexer including means for scrambling the parallel-formatted information according to a first predetermined scrambling pattern;

a transmitter for transmitting the multiplexed and scrambled information in a parallel format and at the same transmission rate in a selected number of the plurality of optical channels comprising a transmission group, wherein each of the optical channels in the transmission group is adapted to receive one serial bit stream of the multiplexed and scrambled information;

means for scrambling the serial bit stream within each of the optical channels in the transmission group according to a second predetermined scrambling pattern, whereby a plurality of stages of scrambling are applied to the information being transmitted in the wavelength division multiplexed signal;

means for routing the serial bit streams among the optical channels in the transmission group according to a third predetermined scrambling pattern, further characterized in that the wavelength division multiplexed signal includes a plurality of transmission groups, the arrangement further comprising means for transferring information being transmitted in one of the plurality of transmission groups for transmission in another one of the plurality of transmission groups according to a fourth predetermined scrambling pattern.

13. The arrangement of claim 9, further comprising means for encrypting the parallel-formatted information supplied by the at least one source.

14. The arrangement of claim 9, wherein the parallel-formatted information supplied by the at least one source is encrypted.

15. The arrangement of claim 9, wherein the multiplexed information comprises interleaved bytes of information in a parallel format so that parallel-formatted information supplied by a first source is byte interleaved with parallel-formatted information supplied by at least a second source.

16. The arrangement of claim 9, further comprising means for inserting dummy bytes for transmission along with the multiplexed information.

17. The method according to claim 4, further comprising the step of encrypting the parallel-formatted information supplied by the at least one source.

18. The method according to claim 4, wherein the multiplexed information comprises interleaved bytes of information in a parallel format so that parallel-formatted information supplied by a first source is byte interleaved with parallel-formatted information supplied by at least a second source.

19. The arrangement according to claim 12, further comprising means for encrypting the parallel-formatted information supplied by the at least one source.

20. The arrangement according to claim 12, wherein the multiplexed information comprises interleaved bytes of information in a parallel format so that parallel-formatted information supplied by a first source is byte interleaved with parallel-formatted information supplied by at least a second source.

* * * * *